Patented Sept. 13, 1932

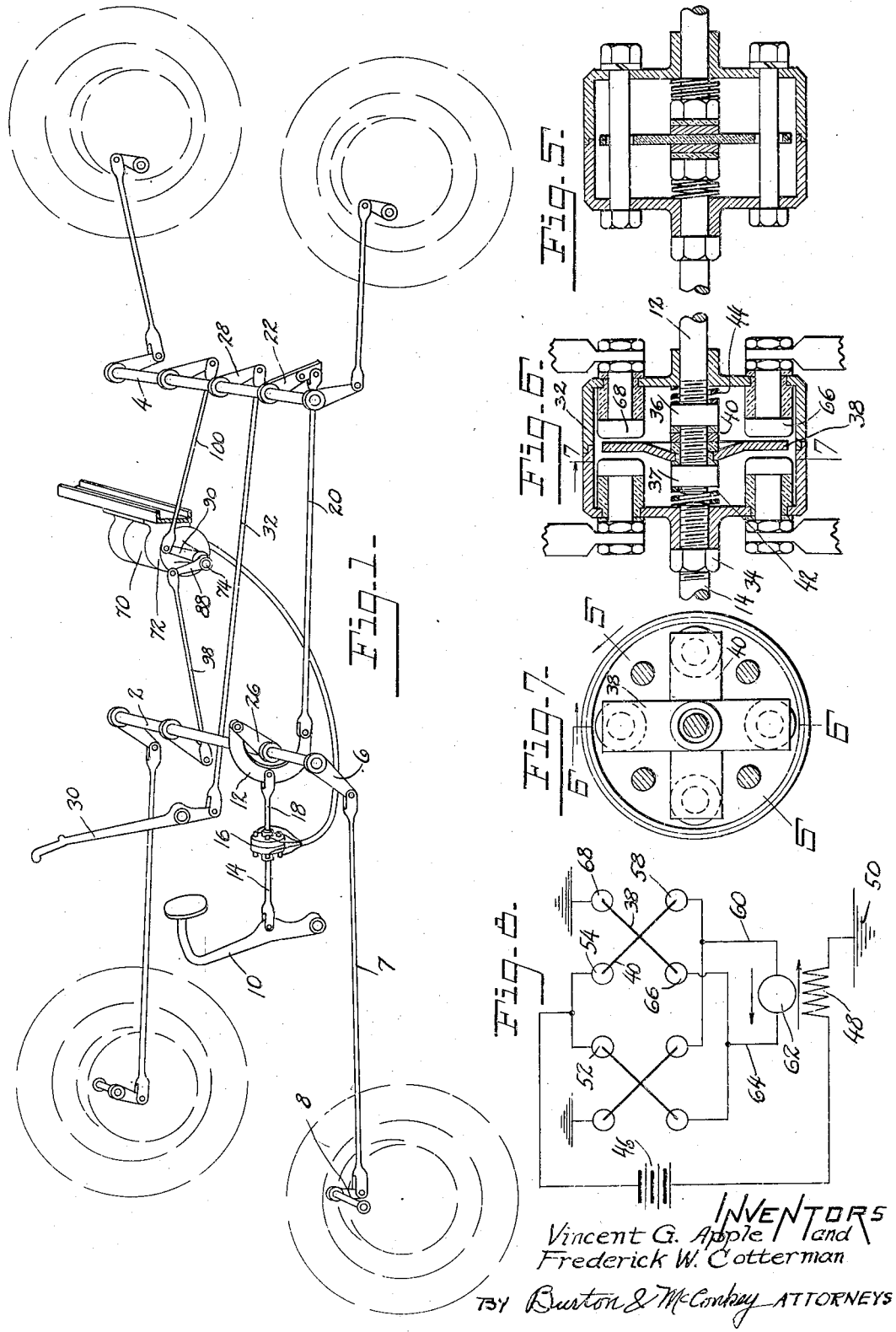

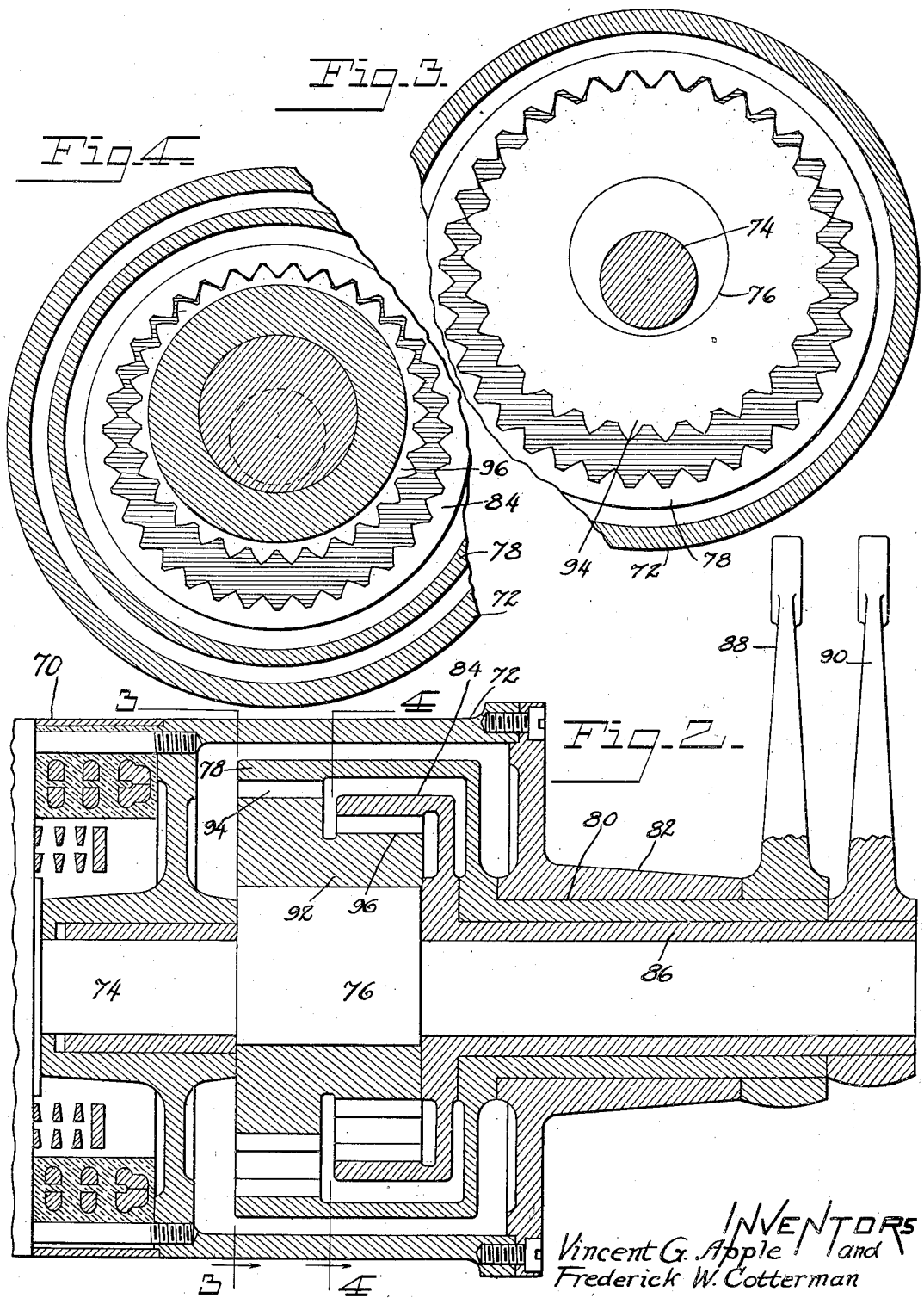

1,876,542

UNITED STATES PATENT OFFICE

VINCENT G. APPLE AND FREDERICK W. COTTERMAN, OF DAYTON, OHIO, ASSIGNORS TO BENDIX BRAKE COMPANY, OF SOUTH BEND, INDIANA, A CORPORATION OF ILLINOIS

VEHICLE BRAKE

Application filed November 16, 1929. Serial No. 407,764.

Our invention relates to automotive vehicle brakes and has particular reference to that type known as the "booster brake hookup," wherein a power means is utilized in conjunction with the pressure manually exerted through the brake foot pedal to apply the brakes.

An object of our invention is to equalize the pressure applied to at least two brakes or sets of brakes by power mechanism, and it is shown embodied in the brakes of a four wheel vehicle brake system by means of the "booster" power device itself, thereby attaining a positive rather than a negative equalization of brake pressure during both the application and release of the brakes.

Another object of our invention is to obtain such positive equalization of applied pressure by using a reversible electric motor "booster" power means wherein rotation of the motor shaft in opposite directions functions to apply and release the brakes.

Still a further object of our invention is to so design the brake connection between the motor shaft and the brake shafts that rotation of the motor shaft in a single direction functions to rotate either one of the brake shafts independently of the other whenever the resistance offered by said other shaft exceeds that offered by the one.

Yet a further object of our invention is to furnish such a power mechanism in a conventional four-wheel brake linkage system in such a way that the power applied force constitutes an auxiliary force to that applied by the mechanical linkage.

These objects are attained by so connecting the electric motor shaft to the front and rear brake shafts that whenever the resistance to rotation offered by one of these shafts exceeds that offered by the other, the power transmission to such shaft automatically becomes ineffective while transmission to the other shaft continues until the resistances are equalized.

Further objects and meritorious features of our invention will become apparent from the following description taken in conjunction with the drawings wherein like figures refer to like parts throughout and wherein:

Fig. 1 illustrates more or less diagrammatically a conventional four-wheel brake hook-up embodying our improved "booster" equalizing brake mechanism.

Fig. 2 is a longitudinal cross section taken through the center of the "booster" mechanism.

Fg. 3 is a section taken on the line 3—3 of Fig. 2.

Fig. 4 is a section taken on the line 4—4 of Fig. 2.

Fig. 5 is a section line taken through the reversing switch on the line 5—5 of Fig. 7.

Fig. 6 is a section taken on the line 6—6 of Fig. 7.

Fig. 7 is a section taken on the line 7—7 of Fig. 6.

Fig. 8 is a wiring diagram.

Fig. 1 illustrates diagrammatically our complete "booster brake hook-up" as utilized on an automotive vehicle. As disclosed therein the brake shafts 2 and 4 are connected up to the brake applying mechanism on each of the four wheels through the conventional linkage 6, 7, and 8. Operating pedal 10 is connected to the equalizing bar 12 by means of the linkage broadly indicated in Fig. 1 as 14, 16 and 18. One extremity of this equalizing bar is connected to the rear brake shaft by means of the rod 20 and the arm 22, which is secured to the brake shaft 4. The other extremity of this equalizing bar is secured to the arm 26 which is attached to the front brake shaft 2. Thus the pressure exerted on the pedal 10 functions through the customary linkage to apply both the front and the rear wheel brakes. The rear brake shaft 4 has secured thereto another arm 28 and this arm is connected to a hand operated member 30 through the rod 32. In this way the rear wheel brakes may be operated independently of the front wheel brakes, and through the same brake shaft.

As one element in the linkage system which connects brake pedal 10 to the equalizing bar 12 we have used an electric reversing switch (such as the one shown in the patent to Andres, No. 1,625,444) broadly indicated in Fig. 1 by the numeral 16, but shown in detail in Figs. 5–7. The rod 14 extending from the brake pedal 10 is threaded into the left wall of the casing 32 and held by means of the lock nut 34. The rod 12 is slidably received in a perforated boss on the right wall of the casing and is provided on its extremity inside the casing with two nuts 36 and 37 which clamp between them insulating washers and a pair of cross contact-bridging members 38 and 40. A spring 42 is confined between the nut 37 and the left wall of the casing and another spring 44 is confined between the nut 36 and the right wall. These two springs normally hold the contact bridge device in what may be termed a neutral position, with both the field and the armature circuits open. Regardless of which set of contacts is bridged by device 38—40, the field current is in the same direction flowing through a circuit including the battery 46 and the field 48 and grounded at 50 at one end and connected to contacts 52 and 54 at the other end.

Depression of pedal 10 pulls on the casing member 32 to compress the spring 44 and causes the member 38 to bridge the contacts 66 and 68 and number 40 to bridge contacts 54 and 58. The circuit now includes the battery grounded through the field 48, member 40, contact 58, lead 60, armature 62, lead 64, contact 66, member 38 and contact 68 which is grounded.

In this electric circuit is a motor 70 and the contact above described causes the motor to run in one direction. When the pedal member 10 is released the pedal-returning spring, which is much stronger than the small springs 42 and 44, moves the casing 32 in a direction to compress spring 42, bridging the left hand contacts. The circuit is now reversed, since the field current is not reversed and the armature current is reversed and the direction of rotation of the motor shaft will be reversed. When the brakes are released springs 42 and 44 will again balance and the motor circuit will be open.

Integral with the motor 70 is a casing 72 having a tubular hub portion 82. The motor shaft 74 extends through the gear case and is provided with an eccentric portion 76 at its mid part. A cup shaped internal gear 78 has a tubular journal 80 revolvable in the tubular hub member 82 of casing 72, while a smaller cup shaped internal gear 84 is provided with a tubular journal 86 rotatable within the journal 80 and about the motor shaft 74.

The journals 80 and 86 are provided with arms 88 and 90, respectively, which are rigidly secured thereto. The eccentric portion 76 of the motor shaft is provided with a double external gear 92 which is free to revolve about the eccentric portion. One side 94 of this double external gear is in mesh with the internal cup gear 78, while the other side 96 is in mesh with the internal cup gear 84. The cup gear 78 is provided about its periphery with 36 teeth while the cup gear 84 has 35 teeth.

Each side 94 and 96 of the double external gear 92 contains an equal number of teeth about its periphery while the internal cup gears, as may be seen in Figures 2–4, are of unequal diameter and provided with an unequal number of teeth, the difference in the number being extremely small. When the brake operating member 10 is depressed the tension in the reversing switch 16 functions to close the circuit, thereby operating the motor. When the motor is operated the gear 92 is bodily revolved through an orbit described by the axis of the eccentric portion 76 and rotated about the eccentric by engagement of the internal with the external teeth. If, now, the motor shaft rotates one turn and the cup gear 84 is held against rotation the cup gear 78 will rotate in the same direction as the motor 1/36th of a turn. However, if the cup gear 78 is held against rotation the cup gear 84 will rotate opposite to the direction of rotation of the motor 1/35th of a turn.

The particular ratio of the number of teeth on each gear to one another has been selected for the purpose of illustration only, and it is obvious that they are not to be regarded as material limitations.

From the above description it obviously follows that when substantially equal restraint to rotation of both cup gears 78 and 84 is imposed by brake connections 98 and 100 to the arms 88 and 90 these arms will be oppositely operated and perfect equalization will obtain because either of the arms may stop to advance the other if the resistance of one arm to being moved is greater than the resistance of the other.

It is apparent that we have provided a differential gearing connection between the electric motor power device and the front and rear wheel brake shafts 2 and 4 which acts whenever there is a difference of torque being applied to the two brake shafts to equalize that torque automatically. And whereas we have illustrated and described one particular embodiment of our inventive thought, various changes and modifications may become apparent to those skilled in the art and for that reason we intend to limit ourselves only within the scope of the appended claims.

We claim:

1. Brake mechanism comprising, in combination, at least two brakes, a brake operating member, mechanical linkage connecting said member and brakes for applying the latter, power means controlled by the tension in the mechanical linkage for applying the brakes, and means constituting a part of the power means whereby the pressure applied thereby to each of the brakes is automatically equalized.

2. Brake mechanism comprising, in combination, at least two brakes, a brake operating member, mechanical linkage connecting said member with the brakes, a reversible electric motor, a reversing switch in said mechanical linkage controlling the motor for reversible operating by the tension therein, means for transmitting power from the motor to the brakes, said means including means for automatically equalizing the power transmitted to said two brakes.

3. Brake mechanism comprising, in combination, at least two brakes, a brake operating member, mechanical linkage connecting said member with the brakes, a reversible electric motor, a reversing switch in said mechanical linkage controlling the motor for reversible operation by the tension therein, means for transmitting power from the motor to the brakes whereby the brakes are positively applied and released by the reversible operation of the motor, said means including means for automatically equalizing the power transmitted to said two brakes.

4. Brake mechanism including in combination brakes, two brake actuating arms connected therewith to apply the brakes, an electric motor, and differential gearing means for transmitting power from the motor to each brake arm whereby the braking power thereof is automatically equalized, said gearing including a ring gear eccentrically journalled upon the motor armature shaft.

5. Brake mechanism including in combination brakes, an electric motor, driving connections between said motor and said brakes including differential gearing whereby greater resistance offered to one brake than to another renders its connection with the motor inoperative until the resistance offered by the brakes is equalized, said gearing including a ring gear eccentrically journalled upon the motor armature shaft.

6. Brake mechanism comprising front wheel brakes, rear wheel brakes, a brake shaft for actuating each set of brakes, an electric motor, an arm for actuating each brake shaft, and operable driving connections between the motor and each arm whereby one arm may stop to advance the other if the resistance offered by the one is greater than the other.

7. Brake mechanism comprising front wheel brakes, rear wheel brakes, a brake shaft for actuating each set of brakes, an electric motor connected with said shafts through driving mechanism adapted to rotate the shafts equally so long as the resistance thereof to rotation is equalized, an arm for actuating each brake shaft, and operable driving connections between the motor and each arm whereby one arm may stop to advance the other if the resistance offered by the one is greater than the other.

8. Brake mechanism comprising front wheel brakes, rear wheel brakes, a brake shaft for actuating each set of brakes, an electric motor, an arm for actuating each brake shaft, and operable driving connections including differential gearing, between the motor and each arm whereby one arm may stop to advance the other if the resistance offered by the one is greater than the other.

9. In a brake system having a front wheel brake shaft and a rear wheel brake shaft, power means for automatically equalizing the torque applied to each shaft comprising an electric motor including a motor shaft having an eccentric portion, a double external gear free to rotate thereabout, one side of said gear being of greater diameter than the other while having an equal number of teeth, two internal gears having an unequal number of teeth in mesh with the respective sides of said external gear, and operative connections between said internal gears and the brake shafts.

10. Braking mechanism including in combination brake shafts, a reversible electric motor, connections between said motor and shafts whereby rotation of the motor shaft in one direction applies the brakes and in the other releases them, said connections including differential gearing whereby unequal torques on said shafts vary the motor effort applied thereto to produce equalization, said gearing including a ring gear eccentrically journalled upon the motor armature shaft.

11. In combination with brake mechanism of the class described, an electric motor including an armature shaft, a pair of brake actuating arms, an external ring gear eccentrically journalled upon said armature shaft, and operating connections between said arms and ring gear including an internal ring gear for each arm.

12. In combination with brake mechanism of the class described, an electric motor including an armature shaft, a pair of brake actuating arms, an external ring gear eccentrically journalled upon said armature shaft, operating connections between said arms and ring gear including an internal ring gear for each arm, and mechanical means operable independently of said motor coupled with the brakes to actuate the same.

13. In combination with brake mechanism of the class described, a reversible electric motor including an armature shaft, a ring gear eccentrically journalled on said armature shaft and comprising rings of different diameter, independently rotatable ring gears enmeshed with said first mentioned ring gears, and brake actuating arms coupled with each of said independently rotatable ring gears.

14. Brake mechanism comprising brakes, a pair of brake actuating shafts, a manually operable control member, mechanical linkage connecting said brake operating shafts with said control members, a reversible electric motor having an external ring gear eccentrically journalled about its armature shaft, said ring gear including rings of different diameter, internal ring gears enmeshed with said external ring gear, operative connections between said external gears and said brake actuating shafts, and means constituting a part of said mechanical linkage operable to control energization of said motor.

In testimony whereof, we, VINCENT G. APPLE and FREDERICK W. COTTERMAN, sign this specification.

VINCENT G. APPLE.
      FREDERICK W. COTTERMAN.